United States Patent [19]
Urban

[11] Patent Number: 5,907,982
[45] Date of Patent: Jun. 1, 1999

[54] DRIVE FOR A DOUBLE SCREW EXTRUDER

[75] Inventor: Ludger Urban, Isselburg, Germany

[73] Assignee: A. Friedr. Flender AG, Bocholt, Germany

[21] Appl. No.: 08/941,909

[22] Filed: Oct. 1, 1997

[30] Foreign Application Priority Data

Dec. 20, 1996 [DE] Germany ................. 196 53 331

[51] Int. Cl.⁶ .................. F16H 57/02; B60K 7/00
[52] U.S. Cl. .......................... 74/606 R; 180/305
[58] Field of Search ............. 74/606 R; 180/305, 180/307, 344; 60/487, 489

[56] References Cited

U.S. PATENT DOCUMENTS

| | | | |
|---|---|---|---|
| 4,523,493 | 6/1985 | Weib ......................... | 74/606 |
| 5,377,487 | 1/1995 | Azuma et al. ............... | 60/487 |
| 5,505,279 | 4/1996 | Louis et al. ................ | 180/305 |
| 5,515,677 | 5/1996 | Irikura ....................... | 60/435 |
| 5,694,816 | 12/1997 | Okada et al. ............... | 74/606 |

*Primary Examiner*—Vinh T. Luong
*Attorney, Agent, or Firm*—Max Fogiel

[57] ABSTRACT

A transmission for a twin-screw extruder with a housing (1) that accommodates a take-off shaft (5) driven by a gear and another take-off shaft (11) driven by the first take-off shaft and two distributor shafts (9) on each side. The housing is divided along a sectional joint (18) into directly connected halves (19 & 20). The housing has only one sectional joint, which is vertical and extends along the second take-off shaft. The second take-off shaft and the distributor shafts are accommodated in the sectional joint, the first take-off shaft in one housing half (20), and the driveshaft in the other housing half (19).

1 Claim, 2 Drawing Sheets

DRIVE FOR A DOUBLE SCREW EXTRUDER

BACKGROUND OF THE INVENTION

The present invention concerns a transmission for a twin-screw extruder.

The two screws in extruders of this genus are slightly separated and rotate in the same or in opposite senses. The transmission's take-off shafts must accordingly also be close to each other and be rotated at the same torque. The purpose of the transmission is to reduce the speed of the motor, to convert and divide the torque, and to accommodate the axial forces that accompany the extrusion.

The housing of one known transmission of this genus (European Published Application 716 914) is divided into an intake half and an outtake half by a vertical sectional joint. The intake half accommodates a gear and the intake end of the distributor shafts. This approach allows a shorter transmission and housing. To facilitate assembly, the housing is divided along and at the level of each shaft, with the intake half including two and the outtake half three horizontal plane areas. The expense of machining the housing increases, and the precision of the transmission decreases, however, with the number of sectional joints.

SUMMARY OF THE INVENTION

The object of the present invention accordingly is to improve the generic housing to the extent that the transmission can be operated more precisely.

This object is attained in accordance with the present invention by the characteristics recited in the body of the claim.

Displacing the vertical sectional joint along the second take-off shaft makes it possible to use only one sectional joint. Fewer housing flange surfaces will accordingly need to be machined, and the housing will operate more precisely. The transmission housing in accordance with the present invention does of course require that the components mounted on the shafts inside the housing can be inserted from the end. This requirement, however, is satisfied by the transmission in accordance with the invention.

BRIEF DESCRIPTION OF THE DRAWINGS

One embodiment of the present invention will now be specified with reference to the accompanying drawing, wherein.

DESCRIPTION OF THE PREFERRED EMBODIMENTS

Figure 1:
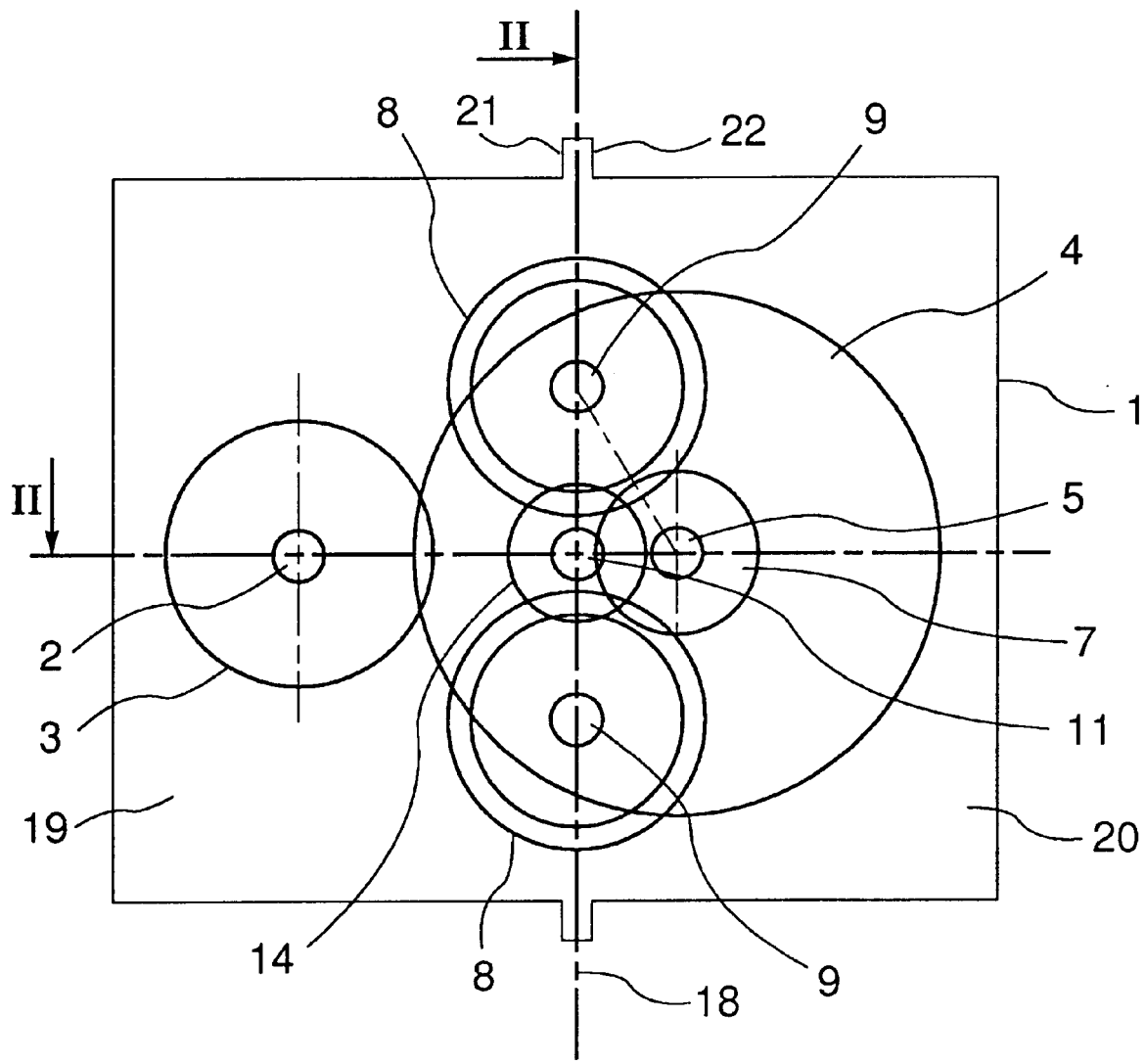
FIG. 1 is a side view of a transmission and FIG. 2 is a section along the line II—II in FIG. 1.

The illustrated transmission is intended for a twin-screw extruder. It is accommodated in a housing 1 and incorporates a driveshaft 2 with a pinion 3 mounted on it. Pinion 3 is engaged by a cogwheel 4. Cogwheel 4 is mounted tight on a take-off shaft 5. The take-off shaft 5 in the illustrated embodiment comprises three sections 5.1, 5.2, 5.3 that rotate as a unit. Shaft section 5.1 is accommodated in the intake end of housing 1 in two radial bearings 6. The third section 5.3 of first take-off shaft 5 extends out of the take-off end of housing 1 and connects outside the housing with one of the screws in an unillustrated twin-screw extruder.

Another cogwheel 7 is mounted tight on the second section 5.2 of first take-off shaft 5 and is engaged by two other cogwheels 8, each on the intake end of two distributor shafts 9. The intake ends of distributor shafts 9 are mounted in radial bearings 10 on each side of cogwheels 8. One distributor shaft 9 is above and the other below another take-off shaft 11. The take-off ends of distributor shafts 9 are mounted in radial bearings 12. Mounted on each distributor shaft 9 is a cogwheel 13. Cogwheel 13 is engaged by another cogwheel 14 mounted tight on second take-off shaft 11.

Second take-off shaft 11 is mounted in two radial bearings 15 and one axial bearing 16. Axial bearing 16 is a tandem or multiple bearing. The end of second take-off shaft 11 that extends out of housing 1 connects with the second screw in the twin-screw extruder.

The first section 5.1 of first take-off shaft 5 is supported in housing 1 by an axial bearing 17. Axial bearing 17 can be either a simple bearing or a tandem or multiple bearing.

Figure 2:
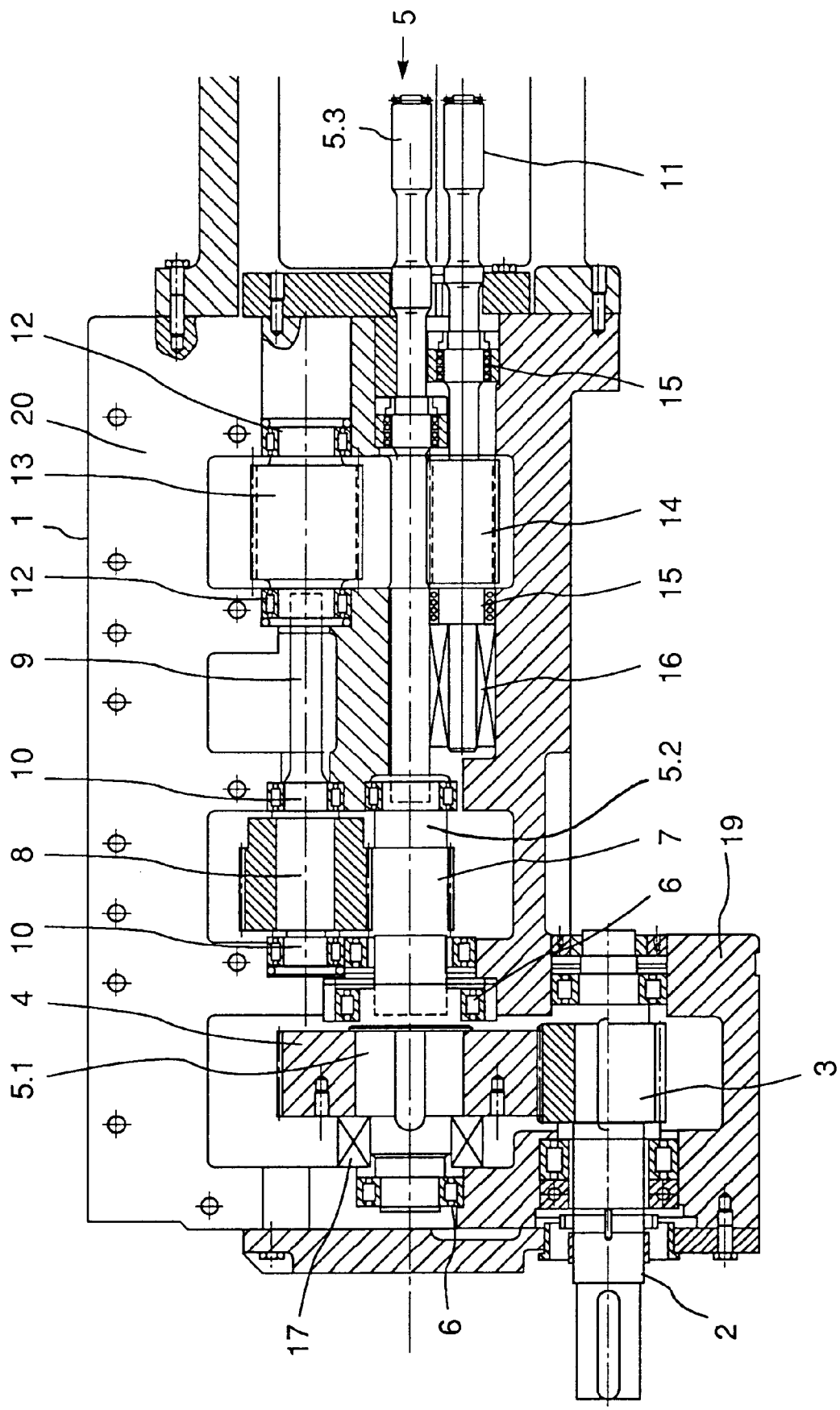

FIG. 2 shows that the second take-off shaft 11, the distributor shafts 9, and the driveshaft 2 are displaced in relation to the other shafts.

The housing 1 in this embodiment is divided by a sectional joint 18 into two halves 19 and 20. Sectional joint 18 is vertical and extends along second take-off shaft 11. Housing half 19 is provided with a flange 21 and housing half 20 with a flange 22. The two halves are attached by screws that extend through the flanges and can be detached by removing the screws. The contact surfaces of the flanges are machined.

One half of second take-off shaft 11 is accommodated in housing half 19, and one half of each distributor shaft 9 is accommodated in housing half 20, along vertical sectional joint 18. First take-off shaft 5 is accommodated in housing half 20 and driveshaft 2 in housing half 19. The components mounted on first take-off shaft 5 and driveshaft 2, specifically bearing 6 and cogwheels 4, 7, and 3, are inserted when the shafts are assembled.

I claim:

1. A combination of transmission means and a twin-screw extruder, comprising: a housing; a first take-off shaft in said housing; means for driving said first take-off shaft; two distributor shafts driven by said first take-off shaft; a second take-off shaft driven through said distributor shafts and said first take-off shaft; said housing being divided along a single vertical sectional joint into directly connected housing halves, said sectional joint extending along said second take-off shaft, said distributor shafts being accommodated in said sectional joint, said first take-off shaft being located in one of said housing halves, and said driving means being located in the other one of said housing halves.

* * * * *